*Inventor*
JACQUES MULLER

United States Patent Office 3,223,243
Patented Dec. 14, 1965

3,223,243
FLOATING SEPARATOR
Jacques Muller, 123 Ave. du General de Gaulle,
La Garenne-Colombes, France
Filed June 14, 1962, Ser. No. 202,512
Claims priority, application France, Aug. 22, 1961,
871,271
3 Claims. (Cl. 210—242)

This invention relates to apparatus for separating a light substance from a heavier liquid with which it is mixed or in which it is suspended or upon which it floats, for example, waste oil floating on water, and it relates more particularly to a floating separator which is intended for carrying out a preliminary separation of the substance from the heavier liquid prior to a more complete separation in other separating apparatus.

It is often required to separate two liquids having different densities, for example, in cases where waste oil is floating on the surface of the sea or on lakes or on rivers, or in other cases where one has become contaminated by the other. The invention is useful in such cases but is also effective in cases where the lighter substance is not a liquid.

One object of the invention is to provide a floating separator in which a light substance and a heavier liquid to be separated are passed through a diffuser to produce a dispersion of the lighter substance in the heavier liquid so that the light substance forms a layer floating on the heavier liquid and the floating layer is then aspirated through a suction bell disposed above the diffuser.

Another object is to produce a floating separator in which a diffuser through which a mixture or suspension of a light substance and a heavier liquid are passed is supported on one or more floats to maintain it at such a level that the upper surface of the diffuser is maintained substantially at the under surface of a floating layer of the light substance and a suction bell disposed above the diffuser is supported on one or more floats to maintain it at such a level that the under surface of the bell is maintained substantially at the upper surface of the layer.

A further object is to provide separating apparatus in which a mixture or suspension of a light substance in a heavier liquid are passed through a floating diffuser in a tank in which the heavier liquid and the upper surface of the diffuser are maintained at a predetermined level and a layer of the light substance floating on the surface of the heavier liquid is aspirated through a suction bell maintained at such a height that its under surface is substantially at the upper surface of the layer.

Figure 1:
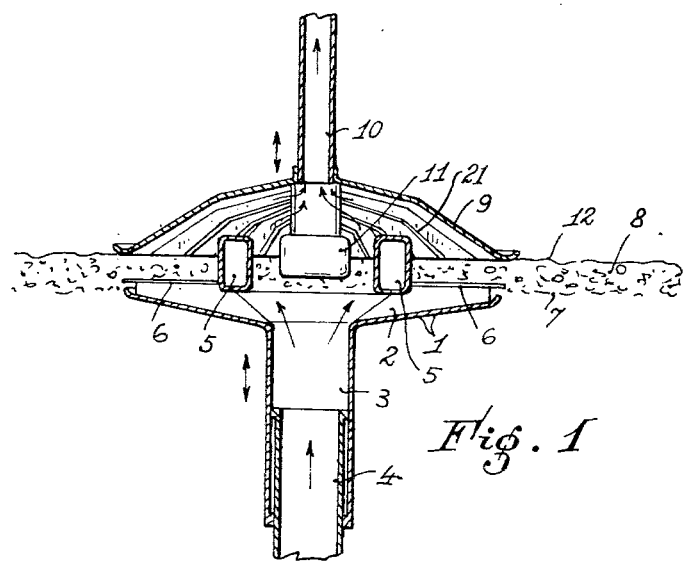
Figure 2:
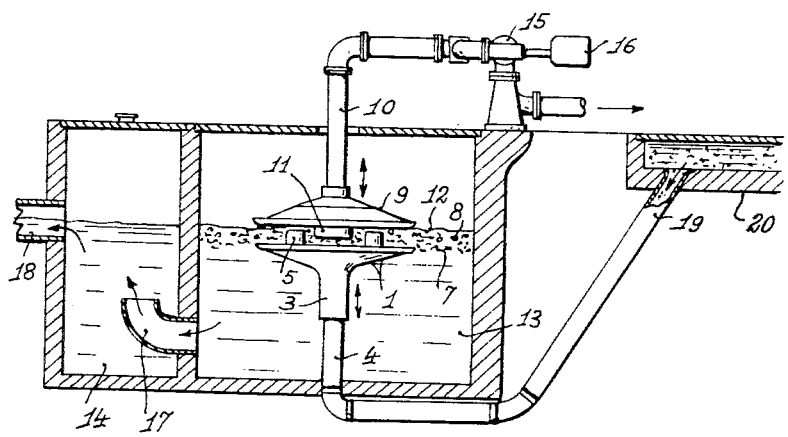

These and other objects of the invention will be more fully appreciated by reading the following description of two embodiments of the invention, with reference to the accompanying drawing, in which:

FIGURE 1 shows in vertical section a floating separator in accordance with the invention; and FIGURE 2 shows in partial section a separating installation including the floating separator shown in FIGURE 1.

Referring initially to FIGURE 1, a floating separator according to one form of the invention comprises a diffuser 1 comprising a lower dish 2 and an upper diffusing element 6, which may be in the form of a sprinkler rose or any other suitable form of diffusing element. The dish 2 communicates with a central vertical tube 3 which is adapted to slide up and down on the end portion of a fixed vertical pipe 4 through which liquid to be separated is supplied. Floats 5 are secured to the diffusing element 6 or to cross-pieces provided for the purpose.

Above the diffuser 1 and co-axial therewith is a hollow suction bell 9 divided into a number of concentric annular sections by means of partitions 21, the bell 9 having a diameter substantially equal to that of the diffuser 1.

The centre of the bell 9 communicates with a suction pipe 10 directed upwardly and adapted for connection to separating and filtering apparatus which is not shown. The pipe 10 is arranged so that it may also move up and down to allow the bell 9 to rise and fall. The bell 9 is provided with a central float 11.

In operation a mixture of liquids to be separated (for example, oil and water) is forced upwardly through the pipe 4 and into the diffuser 1 where it passes through the apertures in the diffusing element 6. In its passage through the diffusing element the two liquids are broken down into small droplets so that they readily separate and the lighter liquid forms a layer 8 floating on the surface of the heavier liquid.

The floats 5 are so adjusted in relation to the densities of the heavier and lighter liquids and the weight of the diffuser that the upper surface of the diffusing element 6 is substantially level with the lower surface 7 of the layer 8 and the float 11 is so adjusted with respect to the weight of the bell 9 and the density of the lighter liquid that the under surface of the bell 9 just rests on the upper surface 12 of the layer 8.

With this arrangement, it will be clear that the diffuser 1 and the bell 9 may rise and fall together if the level of the denser liquid should rise or fall and the bell 9 may also rise and fall independently of the diffuser 1 if the thickness of the layer 8 should vary.

FIGURE 2 shows a floating separator of the kind illustrated in FIGURE 1 applied to separating apparatus, like reference numerals being used for like parts where applicable.

As will be seen in that figure a tank 13 is provided to contain the floating separator. The tank 13 has a vertical pipe 4 surrounded by its base, and a pipe 19 connected to the pipe 4 communicates with a reservoir 20 in which liquid to be separated is held either under pressure or at such a height above the level of the liquid in the tank 13 as to provide sufficient pressure for operation by gravity. The diffuser 1 is submerged to such a depth that the upper surface of the diffusing element is substantially level with the under surface 7 of the layer 8 and the bell 9, supported on its float 11, is at such a level that its under surface is in contact with the upper surface 12 of the layer 8.

A second tank 14 is disposed at the side of the tank 13 and a pipe 17 placed at a low level with respect to the level of the layer 8 leads from the tank 13 into the tank 14, the outlet side of the pipe 17 being bent upwardly, so that liquid flows upwardly into the tank 14. An overflow pipe 18 is arranged at the level at which it is desired to maintain the level of the liquids in the tanks 13 and 14.

The pipe 10 leading from the bell 9 is connected to a bend above the top of the tank 13 and the bend is connected to outlet pipework which includes a ball joint 15 which allows the pipe 10, and with it the bell 9, to rise and fall as required and for the purpose set out in the description of FIGURE 1. A counterweight 16 is attached to the pipework connected to the pipe 10 to provide substantial balance for the weight of the pipework and the bell 9, so that the bell 9 will rise and fall freely with any rise or fall in the level of the upper surface 12 of the layer 8.

The operation of the floating separator is exactly as described in relation to FIGURE 1, the layer 8 being continually aspirated through the suction bell 9 and pipe 10, to be supplied to a final separating apparatus where the small amount of water still mixed with the oil in the layer 8 is completely separated. If desired, a second floating separator may be incorporated in the tank 14.

I claim:
1. Equipment for separating two fluids of different density, the lighter of which floats on the surface of the heavier, comprising a diffuser member having float means associated therewith, said float means being so constructed and arranged as to support said diffuser member in such fluids with the upper surface of said diffuser member positioned in the plane substantially aligned with the undersurface of the lighter layer of fluid, a fixed vertical pipe, said diffuser having a depending inlet pipe slidably mounted on said fixed vertical pipe, said mixture of fluids being forced through said associated pipes into the diffuser, a suction bell positioned over the diffuser member having a second float means associated therewith, said second float means being so constructed and arranged as to support said suction bell in such fluids with the undersurface of said suction bell positioned in a plane substantially aligned with the upper surface of the lighter layer of fluid, a vertical suction pipe secured at one end to said suction bell and rising therefrom, a ball joint connected to said vertical suction pipe to permit vertical movement of said suction bell, a counterweight to balance said suction bell and said vertical pipe about said ball joint, whereby said diffuser and suction bell may rise and fall independently of each other with changes in the thickness of said lighter layer of fluid.

2. The combination set forth in claim 1 in which said diffuser is a sprinkler rose and means are provided to force a mixture of fluid of different densities through said sprinkler rose to effect a dispersion of the fluid passing therethrough to permit ready separation thereof into such layers of different densities.

3. The combination set forth in claim 1 in which a separator tank is provided having a vertical wall therein defining two chambers and having a floor and side walls, a passageway between said chambers adjacent the floor of said tank, said first vertical pipe rising into one of said chambers through the floor thereof, said suction pipe extending upwardly from the top of said chamber, a second tank adapted to contain the mixture of fluids, and positioned at a level above the floor of said first tank, said second tank having a feed pipe connected to the lower end of the first vertical pipe whereby the mixture of fluid will flow under pressure into the diffuser to be discharged into the associated chamber, said other chamber having an outlet in the side wall thereof at the level at which the upper surface of the heavier fluid is to be maintained in the first tank.

References Cited by the Examiner

UNITED STATES PATENTS

| | | | |
|---|---|---|---|
| 882,195 | 3/1908 | Grahn | 210—242 |
| 1,032,458 | 7/1912 | White | 210—242 X |
| 1,852,867 | 4/1932 | White | 210—242 X |
| 2,098,463 | 11/1937 | Morehead | 210—525 |
| 2,439,633 | 4/1948 | Reinhart | 210—525 |
| 2,585,878 | 2/1952 | Tryon | 210—540 |
| 2,608,300 | 8/1952 | Small | 210—242 |
| 2,881,923 | 4/1959 | Nelson | 210—525 |
| 2,888,139 | 5/1959 | Fischer | 210—525 X |

FOREIGN PATENTS 58,268  8/1937  Norway.

REUBEN FRIEDMAN, *Primary Examiner.*

ROBERT F. BURNETT, *Examiner.*